(12) United States Patent
Xu (10) Patent No.: US 11,854,277 B1
(45) Date of Patent: Dec. 26, 2023

(54) ADVANCED NUMBER PLATE RECOGNITION IMPLEMENTED ON DASHCAMS FOR AUTOMATED AMBER ALERT VEHICLE DETECTION

(71) Applicant: Ambarella International LP, Santa Clara, CA (US)

(72) Inventor: Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 565 days.

(21) Appl. No.: 16/562,645

(22) Filed: Sep. 6, 2019

(51) Int. Cl.
| | | |
|---|---|---|
| *G06V 20/00* | (2022.01) |
| *G06V 20/62* | (2022.01) |
| *G06T 7/174* | (2017.01) |
| *G06V 20/20* | (2022.01) |
| *G06V 20/56* | (2022.01) |

(52) U.S. Cl.
CPC .............. *G06V 20/62* (2022.01); *G06T 7/174* (2017.01); *G06V 20/20* (2022.01); *G06V 20/56* (2022.01); *G06V 20/625* (2022.01)

(58) Field of Classification Search
CPC .............. G06K 9/325; G06K 9/00671; G06K 9/00791; G06K 2209/15; G06T 7/174
See application file for complete search history.

(56) References Cited

U.S. PATENT DOCUMENTS

| | | | | |
|---|---|---|---|---|
| 2014/0201213 A1* | 7/2014 | Jackson | ............... | G08G 1/0175 707/741 |
| 2019/0147260 A1* | 5/2019 | May | ..................... | G06V 20/584 382/103 |
| 2020/0349666 A1* | 11/2020 | Hodge | ............... | G01C 21/3438 |
| 2021/0035442 A1* | 2/2021 | Baig | ..................... | G08G 1/0175 |

\* cited by examiner

*Primary Examiner* — Nancy Bitar
*Assistant Examiner* — Xiao Liu
(74) *Attorney, Agent, or Firm* — Christopher P. Maiorana, PC (57) ABSTRACT

An apparatus includes a camera and a processing circuit. The camera may be configured to capture images of an environment around a vehicle. The processing circuit may be configured to (i) perform automated number-plate recognition using the images, (ii) store a history of detected license plates, and (iii) search the history of detected license plates in response to receiving a request from a communication device of a vehicle user for information matching the request.

19 Claims, 8 Drawing Sheets

| LIC NO. | DATE | TIME | LOCATION | VEHICLE DESCRIPTION | | | ETC. |
|---------|------|------|----------|-------|-------|------|------|
| | | | | COLOR | MODEL | MAKE | |
| 402a | 404a | 406a | 408a | 412a | 416a | 414a | |
| 402b | 404b | 406b | 408b | 412b | 416b | 414b | |
| 402c | 404c | 406c | 408c | 412c | 416c | 414c | |
| ... | ... | ... | ... | ... | ... | ... | |
| 402n | 404n | 406n | 408n | 412n | 416n | 414n | |

ADVANCED NUMBER PLATE RECOGNITION IMPLEMENTED ON DASHCAMS FOR AUTOMATED AMBER ALERT VEHICLE DETECTION

FIELD OF THE INVENTION

The invention relates to vehicle cameras generally and, more particularly, to a method and/or apparatus for implementing advanced number plate recognition (ANPR) on dashcams for automated amber alert vehicle detection.

BACKGROUND

Amber alerts are typically broadcast via text messages, radio stations, television stations, cable networks, and/or displayed on commercial electronic billboards. Drivers are not supposed to look at their phones while driving, and most people do not memorize suspicious license plate and/or vehicle information broadcast as part of the Amber alerts. Thus, a lot of opportunities are missed to quickly stop crimes associated with the Amber alerts.

It would be desirable to implement advanced number plate recognition (ANPR) on dashcams for automated amber alert vehicle detection.

SUMMARY

The invention concerns an apparatus including a camera and a processing circuit. The camera may be configured to capture images of an environment around a vehicle. The processing circuit may be configured to (i) perform automated number plate recognition using the images, (ii) store a history of detected license plates, and (iii) search the history of detected license plates in response to receiving a request from a communication device of a vehicle user for information matching the request.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing advanced number plate recognition (ANPR) on dashcams for automated amber alert vehicle detection that may (i) provide a mechanism to automate suspicious vehicle detection, (ii) provide a mechanism to make suspicious vehicle detection much more efficient, (iii) leverage on-camera automatic number plate recognition (ANPR), person and vehicle detection, and vehicle make/model recognition capabilities together with an internet connection on a cellphone of a vehicle occupant to facilitate automated suspicious vehicle identification, (iv) store identified license plate information together with location and time information, (v) run ANPR algorithms on a dashcam or other vehicle camera(s) continuously, (vi) search historical meta-data records on a vehicle mounted camera in response to notification of an Amber alert having been issued, (vii) transmit last known location(s) of vehicle(s) identified in Amber alert to user and/or authorities, and/or (viii) be implemented as one or more integrated circuits.

Figure 1:
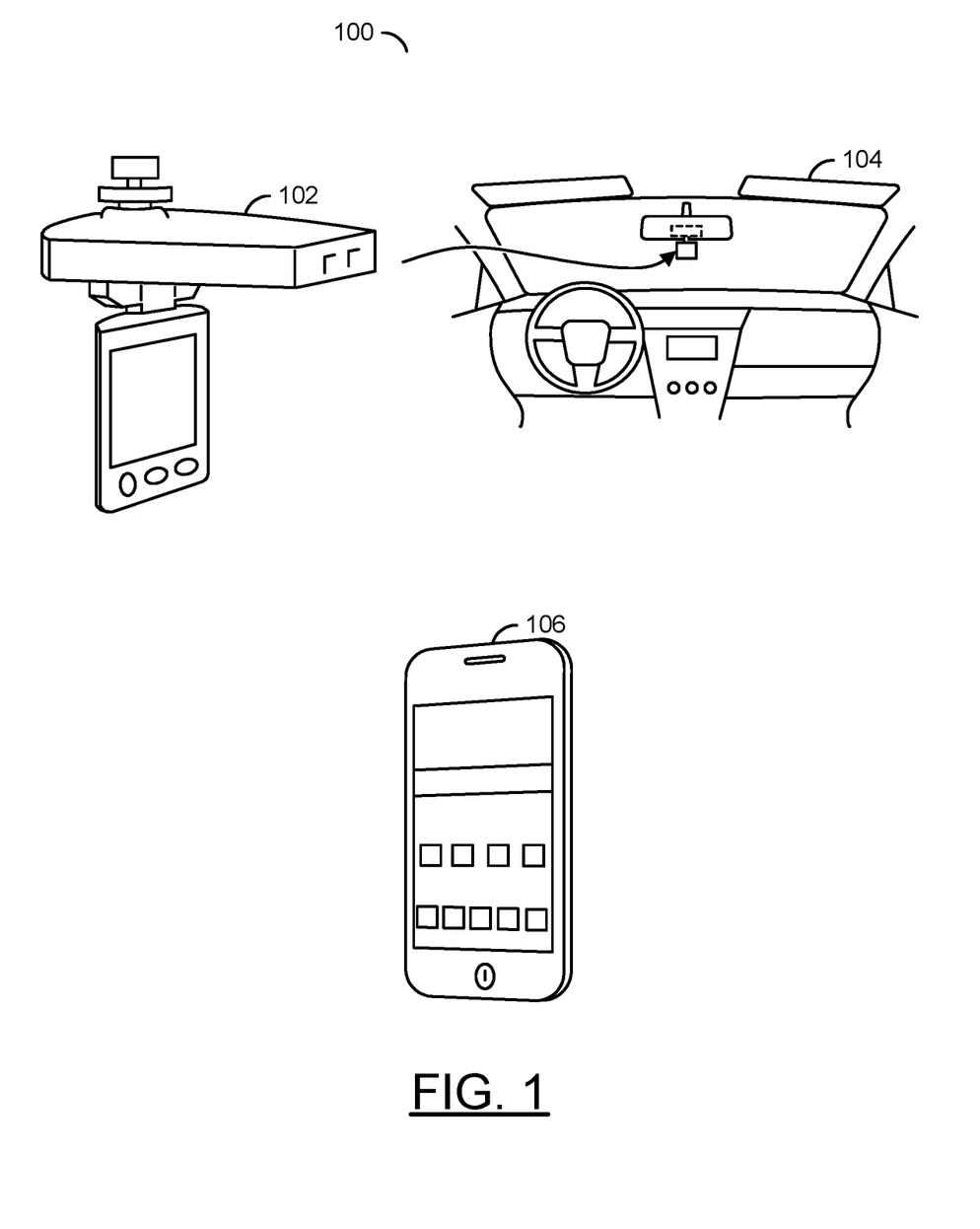
FIG. 1 is a diagram illustrating a vehicle video camera/recorder system in accordance with an example embodiment of the invention.

Referring to FIG. 1, a diagram is shown illustrating a vehicle video camera/recorder system in accordance with an example embodiment of the invention. In one example, a device 100 may be implemented as a dash camera (or dashcam). The dashcam 100 may comprise a processor (or system on chip (SoC)) 102. The processor/Soc 102 may implement an intelligent vision processor. The processor/Soc 102 may be configured to apply a variety of image processing and/or computer vision techniques to images captured by the dashcam 100. In various embodiments, the image processing and/or computer vision techniques may include, but are not limited to, automatic number plate recognition (ANPR), person and vehicle detection, and vehicle make/model recognition capabilities. In various embodiments, the processor/Soc 102 may be configured to store results of the image processing and/or computer vision techniques for later inquiries related to Amber alert (or other emergency alert) notifications.

The dashcam 100 may be configured to be mounted on or near a windshield, a rearview mirror, a dashboard, or some other portion of a vehicle 104. In some embodiments, the dashcam 100 may be configured to be mounted on a motorcycle helmet or glasses (not shown). The dashcam 100 may include global navigation satellite system (e.g., GNSS, GPS, GLONASS, etc.) capabilities, which may be utilized to obtain location, date, and/or time information. The location, date, and/or time information may be stored as metadata with video and/or audio streams generated by the dashcam 100. The dashcam 100 may be configured to continuously record video and/or audio (e.g, in a loop) and/or log data (e.g., metadata, etc.). Thus, the dashcam 100 may serve, for example, as a "black box" recorder. In an example, the dashcam 100 may be used to record video footage relating to operation and surroundings of the vehicle 104 in general.

In response to an emergency-related notification (e.g., an Amber Alert being issued), the dashcam 100 may be configured to transfer at least a portion of recorded data to a user device 106 (e.g., a cellular telephone, smart phone, tablet computer, personal digital assistant (PDA), etc.) using a wireless protocol. In an example, the user device 106 may be configured (e.g., via an installed program or application) to communicate information received in an Amber alert notification to the dashcam 100 and receive information in response from the dashcam 100. The user device 106 may be further configured to notify a user when information related to a notification sent to the dashcam 100 has been received, so the user may decide whether to have the user device forward the information to authorities (e.g., police, sheriff, U.S. Marshals, FBI, state child or adult protective services, etc.).

Figure 2:
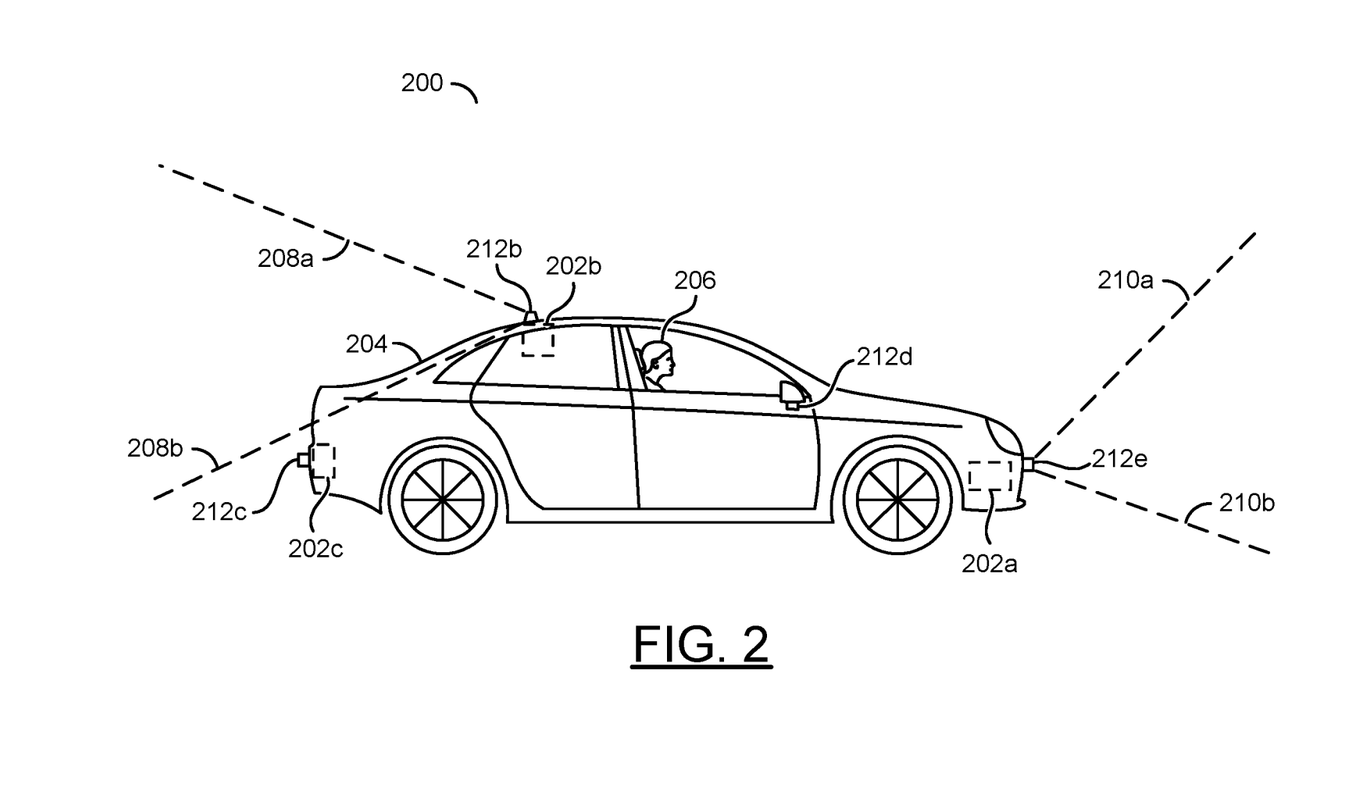
FIG. 2 is a diagram illustrating an example of integrated camera systems inside and outside of a vehicle in accordance with an example embodiment of the invention.

Referring to FIG. 2, a diagram is shown illustrating an example of integrated camera systems inside and outside of a vehicle. In an example, an integrated vehicle camera system 200 may comprise a number of cameras 202a-202n. In an example, the number of cameras 202a-202n may be integrated into an automobile/vehicle 204 as part of an advanced driver assistance system and/or autonomous vehicle system. In various embodiments, the cameras 202a-202n may include external short range exterior cameras for applications including, but not limited to, around vehicle monitoring (AVM) and automatic parking assistance, and rear view cameras. In some embodiments, the vehicle 204 may be an automobile, a truck, a bus, an ATV, an airplane, a drone, etc. The type of the vehicle 204 may be varied according to the design criteria of a particular implementation. A driver 206 is shown seated in the vehicle 204.

In an example, the cameras 202a-202n may be part of an automated driver assistance system (ADAS) of the vehicle 204, which may be configured to continuously record video and/or audio (e.g, in a loop) and/or log data. In an example, similar to the dashcam 100, the cameras 202a-202n may be configured to record video footage relating to operation and surroundings of the vehicle 204 in general. In response to an emergency-related notification (e.g., an Amber alert, etc.) being received by a user device (e.g., a cellular telephone, smart phone, tablet computer, personal digital assistant (PDA), etc.) of the driver 206, the ADAS system of the vehicle 204 may be configured to transfer at least a portion of recorded data to the user device of the driver 206 using a wireless protocol. In an example, the user device of the driver 206 may be configured (e.g., via an installed program or application) to communicate information received in an Amber alert notification to the ADAS system of the vehicle 204 and receive information in response from the ADAS system of the vehicle 204. The user device of the driver 206 may be further configured to notify the driver 206 when information related to a notification sent to the ADAS system of the vehicle 204 has been received, so that the driver 206 may decide whether to forward the information to authorities.

In an example, the vehicle 204 may include a front view camera (e.g., a capture device 202a and a lens 212a), a first rear view camera (e.g., a capture device 202b and a lens 212b), a second rear view camera (e.g., a capture device 202c and a lens 212c), and one or more side mirror cameras (e.g., a capture device 212d and a lens 212d). The cameras may be implemented similarly to the dash camera 100. In an example, each of the cameras 202a-202n of the vehicle 204 may comprise an instance of the processor/SoC 102. In another example, a single instance of the processor/SoC 102 may be integrated into the ADAS system of the vehicle 204 and configured to receive video and sensor data from all of the cameras 202a-202n of the vehicle 204.

In an example, the first rear view camera (e.g., the capture device 202b and the lens 212b) is shown capturing a targeted view from the vehicle 204. In the example shown, the targeted view from the vehicle 204 (e.g., represented by a line 208a and a line 208b) is shown capturing an exterior view to the rear of (e.g., an area behind) the vehicle 204. Similarly, the other cameras may be used to capture video data of a respective targeted view from the vehicle 204. For example, the forward view camera (e.g., a capture device 202a and a lens 212a) may provide a front exterior view of an area (e.g., represented by a line 210a and a line 210b). The number of cameras implemented, direction(s) captured, orientation of the cameras and/or arrangements of the cameras may be varied according to the design criteria of a particular implementation.

The cameras (or capture devices) 202a-202n may be configured to capture video data of the environment in and around the vehicle 204. The processors/SoCs 102 associated with the capture devices 202a-202n may implement computer vision to detect objects and/or understand what is happening near the vehicle 204 (e.g., see the environment as a human driver would see the environment). In an example, the vehicle 204 may also include a radar device, an array of radar devices, a sonar device, an array of sonar devices, a LIDAR device, an array of LIDAR devices, an ultra-sound device, an array of ultra-sound devices, etc. The capture devices 202a-202n may be implemented with RGB or RGB-IR image sensors. In an example, the processors/SoCs 102 associated with the capture devices 202a-202n may be configured to recognize the color, text, and other features of nearby signs, curbs, and/or objects around the vehicle 204.

Figure 3:
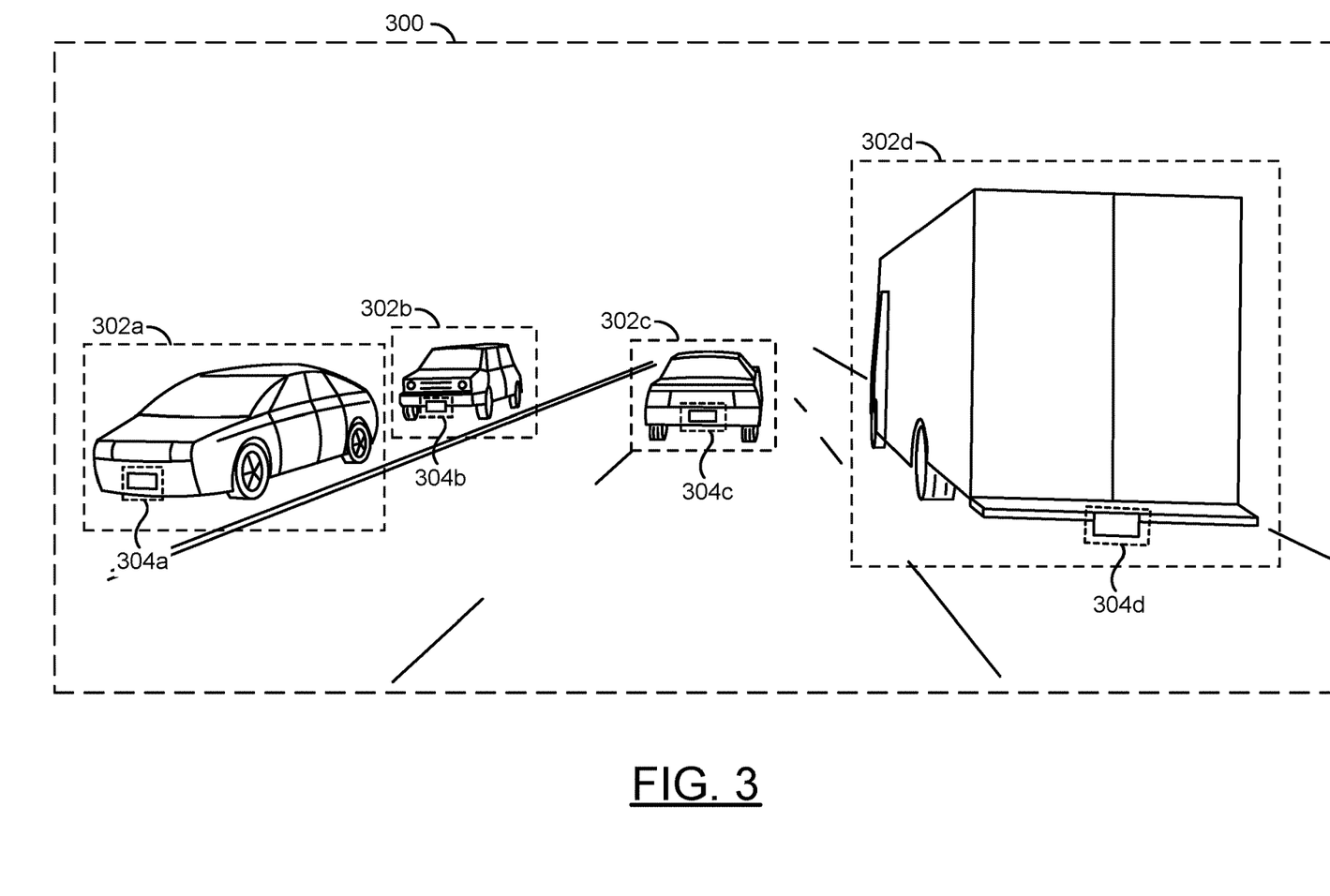
FIG. 3 is a diagram of a video frame illustrating an example of determining vehicle and license plate information.

Referring to FIG. 3, a diagram of a video frame 300 is shown illustrating an example of determining vehicle and license plate information. The video frame 300 generally illustrates a portion of an example field of view of the dashcam 100 and/or cameras 202a-202n. In various embodiments, the processor/SoC 102 may be configured to detect, inter alia, vehicles and license plates in the video frame 300. In various embodiments, the processor/SoC 102 may be configured to perform computer (machine) vision operations on video frames captured by the dashcam 100 and/or cameras 202a-202n. In various embodiments, the processor/SoC 102 may include, but is not limited to, one or more of automatic number plate recognition (ANPR), person and vehicle detection, and vehicle make/model recognition capabilities.

The processor/SoC 102 may implement various computer vision techniques (e.g., feature detection, feature extraction, object detection, object recognition, segmentation, etc.) utilizing hardware, software, and/or a combination of hardware and software. In an example, boxes 302a-302d and 304a-304d illustrate results of performing feature detection and object detection using one or more detectors configured for vehicles and/or license plates. In an example, the processor/SoC 102 may utilize individual detectors to detect each instance of each object type in the video frame 300. In another example, the processor/SoC 102 may utilize multi-object detection to detect the instances of multiple object types in the video frame 300. In an example, the processor/SoC 102 may utilize neural network technology (e.g., a convolutional neural network, deep neural network, etc.). In an example, the neural network technology may be implemented comprising operators implemented with a plurality of hardware engines to provide high performance, real-time analyses with low power consumption.

In various embodiments, the processor/SoC 102 may be configured to perform one or more of automatic number plate recognition (ANPR), person and vehicle detection, and/or vehicle make/model recognition on regions of interests (e.g., boxes 302a-302d and 304a-304d) identified through feature extraction and object detection. Applying the automatic number plate recognition (ANPR), person and vehicle detection, and vehicle make/model recognition techniques on the regions of interest instead of the entire video frame 300 generally provides better performance, lower demand on resources, and lower power consumption. In various embodiments, the processor/SoC 102 may be configured to store results of applying the automatic number plate recognition (ANPR), person and vehicle detection, and vehicle make/model recognition to the video frame 300 in a non-volatile computer readable medium (e.g., FLASH memory, SD memory card, etc.) of the dashcam 100 and/or ADAS system of the vehicle 204. The results are generally stored in a format that facilitates searching the information at a later time.

Figure 4:
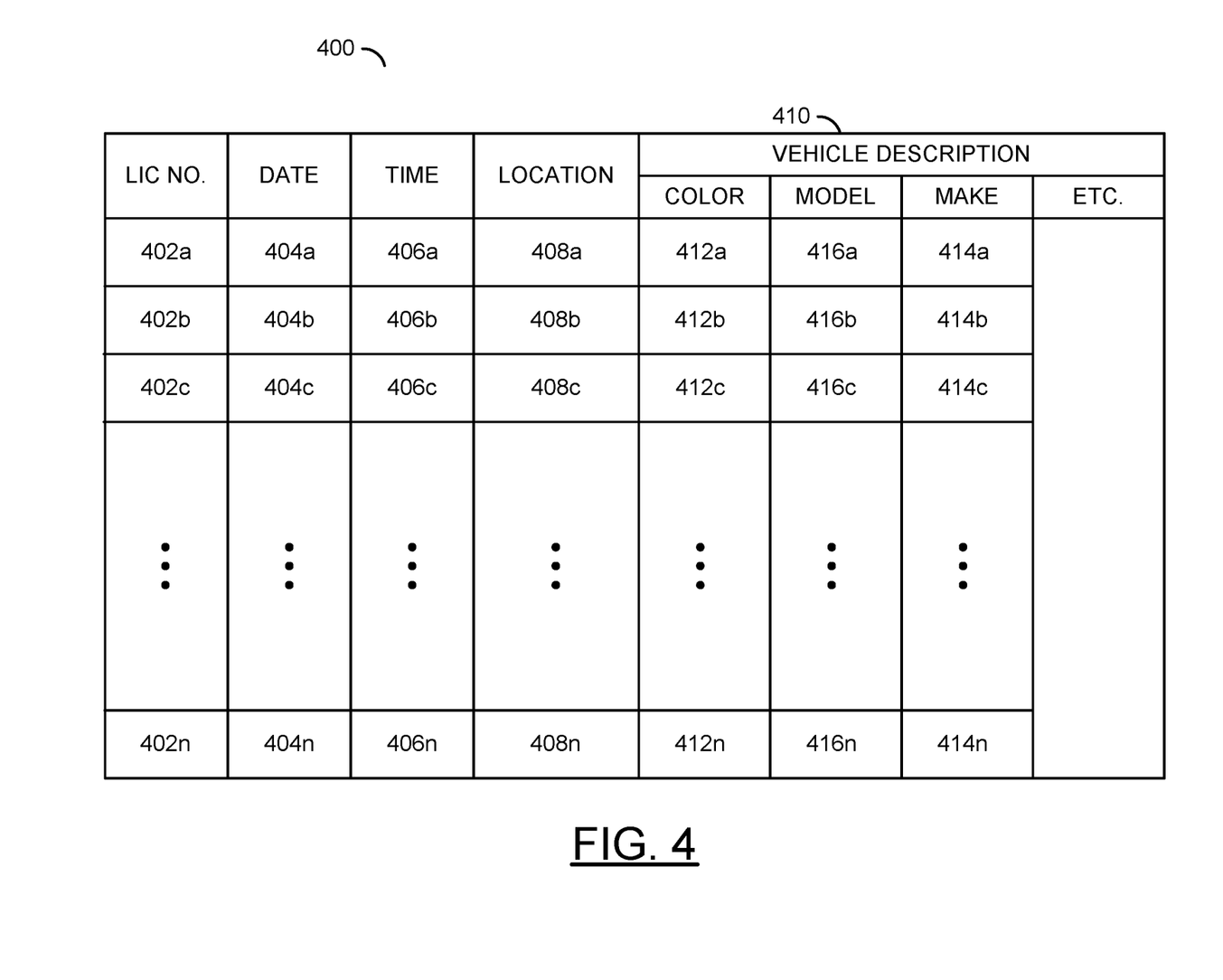
FIG. 4 is a diagram illustrating a process of creating a license plate history in accordance with an example embodiment of the invention.

Referring to FIG. 4, a diagram is shown illustrating a data structure in accordance with an example embodiment of the invention for creating a license plate history. In various embodiments, the dashcam 100 and/or vehicle camera subsystems 202a-202n may capture and analyze video information in real-time. The Dashcam 100 and/or camera subsystems 202a-202n may place the license information with location information and time stamps in a history database structure 400. In one example, the history database structure 400 may be represented as a file stored in a removable storage system (e.g., SD card, micro SD card, CF card, etc.) or a non-removable storage system (e.g., HDD, SSD, eMMC, etc.) of the dashcam 100 or vehicle 204. In an example, the file structure 400 may contain a number of fields including, but not limited to, license plate numbers 402a-402n, time stamps (e.g., date 404a-404n, time 406a-406n), and/or location information 408a-408n. In another example, the file structure 400 may also contain a number of descriptive characteristics of vehicles 410 associated with the license plate numbers (e.g., color 412a-412n, make 414a-414n, model 416a-416n, style, etc.).

In various embodiments, the processor/SoC 102 may maintain read and write pointers into the file structure 400. In an example, the processor/SoC 102 may be configured to continuously update the license plate history data structure 400 and, when notifications are received, concurrently perform searches of the license plate history data structure 400. In various embodiments, the processor/SoC 102 may search the file structure 400 in response to receiving notification from the user device 106 that an Amber alert (or other emergency alert) has been issued. The processor/SoC 102 may be configured to search one or more of the fields of the license plate history data structure 400 for matches to information received from the user device 106 in connection with the notification. The processor/SoC 102 may be further configured to send information relevant to the notification back to the user device 106. In an example where a license plate number is sent as part of an Amber alert, the processor/SoC 102 may search the license plate history data structure 400 for the license plate number and send date, time, location, and/or any other information associated with the license plate number to the user device 106.

Figure 5:
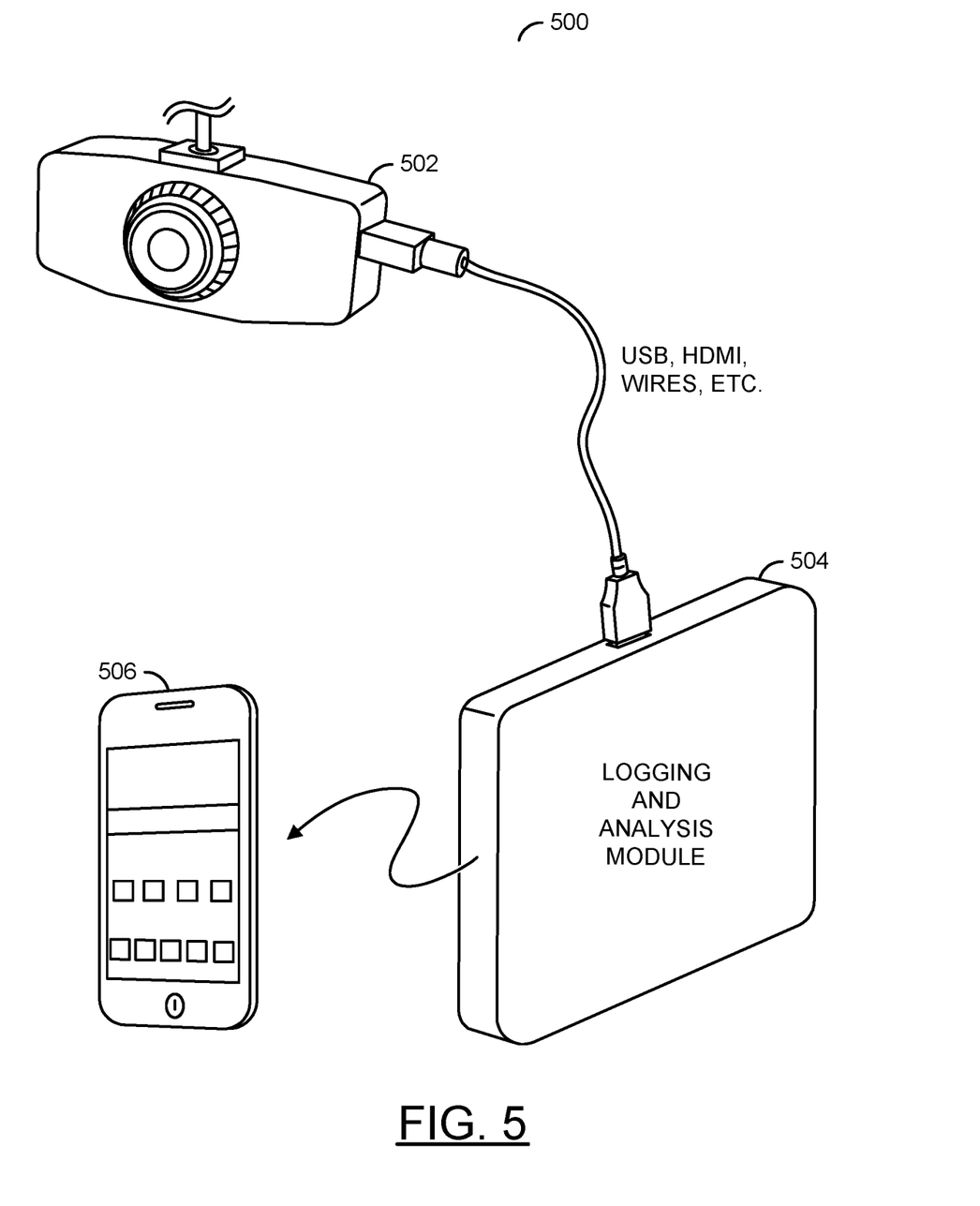
FIG. 5 is a diagram illustrating a camera and separate analysis module in accordance with an example embodiment of the present invention.

Referring to FIG. 5, a diagram is shown illustrating a system 500 in accordance with another example embodiment of the present invention. In some embodiments, the system 500 may comprise a camera 502 and a separate logging and analysis module 504. The camera 502 and the logging and analysis module 504 are generally configured to be removably attached to a vehicle. Thus, the camera 502 and the logging and analysis module 504 may be moved easily from one vehicle to another by a user. In an example, the camera 502 may be connected to the analysis module 504 using a cable or wireless link. The cable may be implemented, for example, as a universal serial bus (USB) cable, a high definition media interface (HDMI) cable, a composite video (e.g., s-VGA) cable, etc. However, other appropriate connections may be implement to meet the design criteria of a particular implementation. The analysis module 504 is generally configured to handle communication with a user device 506 similarly to the communication between the dashcam 100 and the user device 106 described above.

Figure 6:
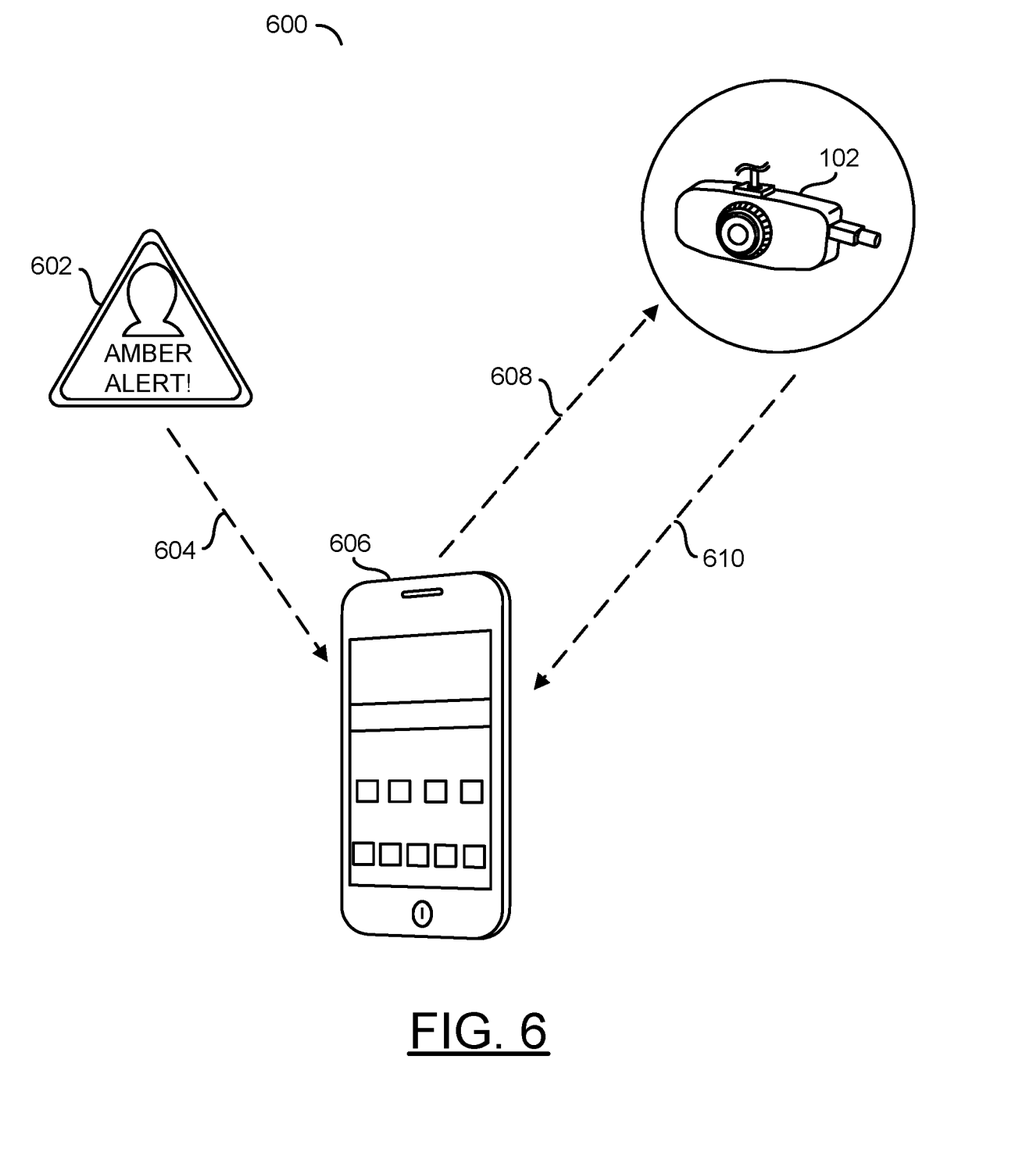
FIG. 6 is a diagram illustrating example data flows in accordance with example embodiments of the invention.

Referring to FIG. 6, a diagram illustrating example data flows in accordance with example embodiments of the invention is shown. In an example, when an Amber alert 602 is issued, a notification with relevant information may be transmitted via a wireless link 604 to a user device 606. The wireless link 604 may be implemented using various wireless protocols (e.g., BLUETOOTH, ZIGBEE, WiFi, SMS, etc.). Upon receiving the notification regarding the Amber alert 602, the user device 606 may communicate the data received in the notification to the dashcam 100 via a wireless link 608. The wireless link 608 may be implemented using various wireless protocols (e.g., BLUETOOTH, ZIGBEE, WiFi, etc.). The processor/SoC 102 within the dashcam 100 may search a stored database using the data received in the notification and communicate any information found to the user device 606 via a wireless link 610. The wireless link 610 may be implemented using various wireless protocols (e.g., BLUETOOTH, ZIGBEE, WiFi, etc.). In an example, the user device 606 may notify the user that information related to the Amber alert was received from the dashcam 100. In an example, the user device 606 may query the user for permission to forward the information to authorities. In another example, the user device 606 may be configurable by the user to automatically forward the information to authorities.

Figure 7:
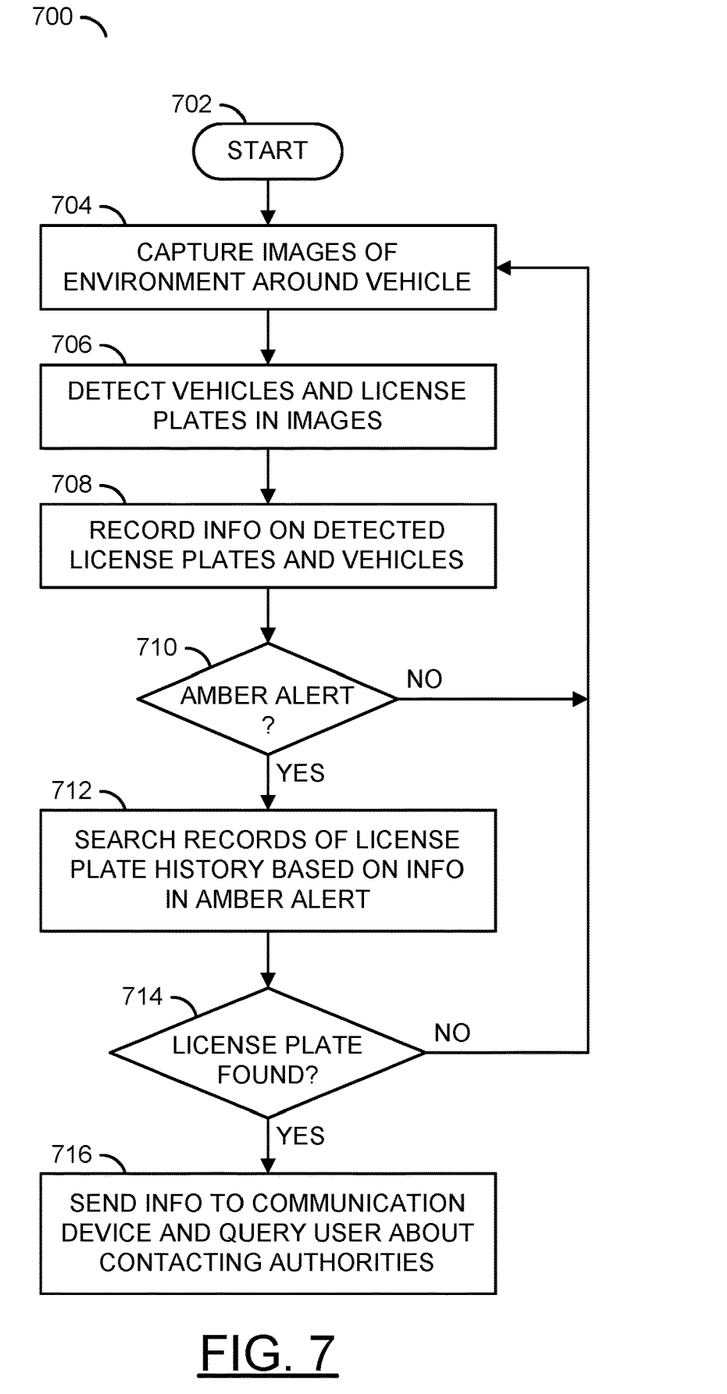
FIG. 7 is a diagram illustrating a process in accordance with an example embodiment of the invention.

Referring to FIG. 7, a flow diagram is shown illustrating a process 700 in accordance with an example embodiment of the invention. In one example, the process (or method) 700 may comprise a step (or state) 702, a step (or state) 704, a step (or state) 706, a step (or state) 708, a decision step (or state) 710, a step (or state) 712, a decision step (or state) 714, and a step (or state) 716. The process 700 may begin in the step 702. In an example, the process 700 may begin when a vehicle is started. In another example, the process 700 may be started when a vehicle is placed in gear or moving. In general, initiation of the process 700 may be varied to meet design criteria of a particular implementation.

In the step 704, the process 700 may capture video data using one or more cameras mounted on a vehicle. In the step 706, the process 700 may apply automatic number plate recognition (ANPR), person and vehicle detection, and/or vehicle make/model recognition techniques to video frames of the captured video data. In the step 708, the process 700 may store license plate information (e.g., number, state, etc.), location information, time stamp information, and or vehicle information in a local memory and/or transmit the information to a remote storage facility (e.g., for security). In an example, the location, date, and time information may be obtained utilizing global navigation satellite system (e.g., GNSS, GPS, GLONASS, etc.) information. In the decision step 710, the process 700 may determine whether notification of an Amber alert (or other emergency) has been received (e.g., from a user device). If a notification has not been received, the process 700 may return to the step 704. When a notification is received, the process 700 may move to the step 712.

In the step 712, the process 700 performs a search of the records stored on the local memory or at the remote site using information (e.g., a license plate number, vehicle description, etc.) received with the notification as a search index. In the decision step 714, the process 700 may determine whether the search was successful in finding information related to the search index. If the search index (e.g., the license plate number, etc.) is not found, the process 700 may return to the step 704. When the search index (e.g., the license plate number, etc.) is found, the process 700 may move to the step 716. In the step 716, the process 700 transmits the information associated with the search index found to the user device and queries the user about contacting authorities. In some embodiments, the process 700 may automatically forward the information to the authorities.

In various embodiments, the process 700 may utilize hands free capabilities of the user device, the dashcam 100, and/or the vehicle. In various embodiments, the steps 704 through 708 may continue to be performed (e.g., concurrently, simultaneously, etc.) with performance of the steps 710 through 716. In an example, the steps 704 through 708 and the steps 710 through 716 may be implemented as separate threads running independently on the processor/SoC 102. In an example, the steps 704-708 may be performed continuously and the steps 710-716 may be performed only in response to receipt of an alert notification.

Figure 8:
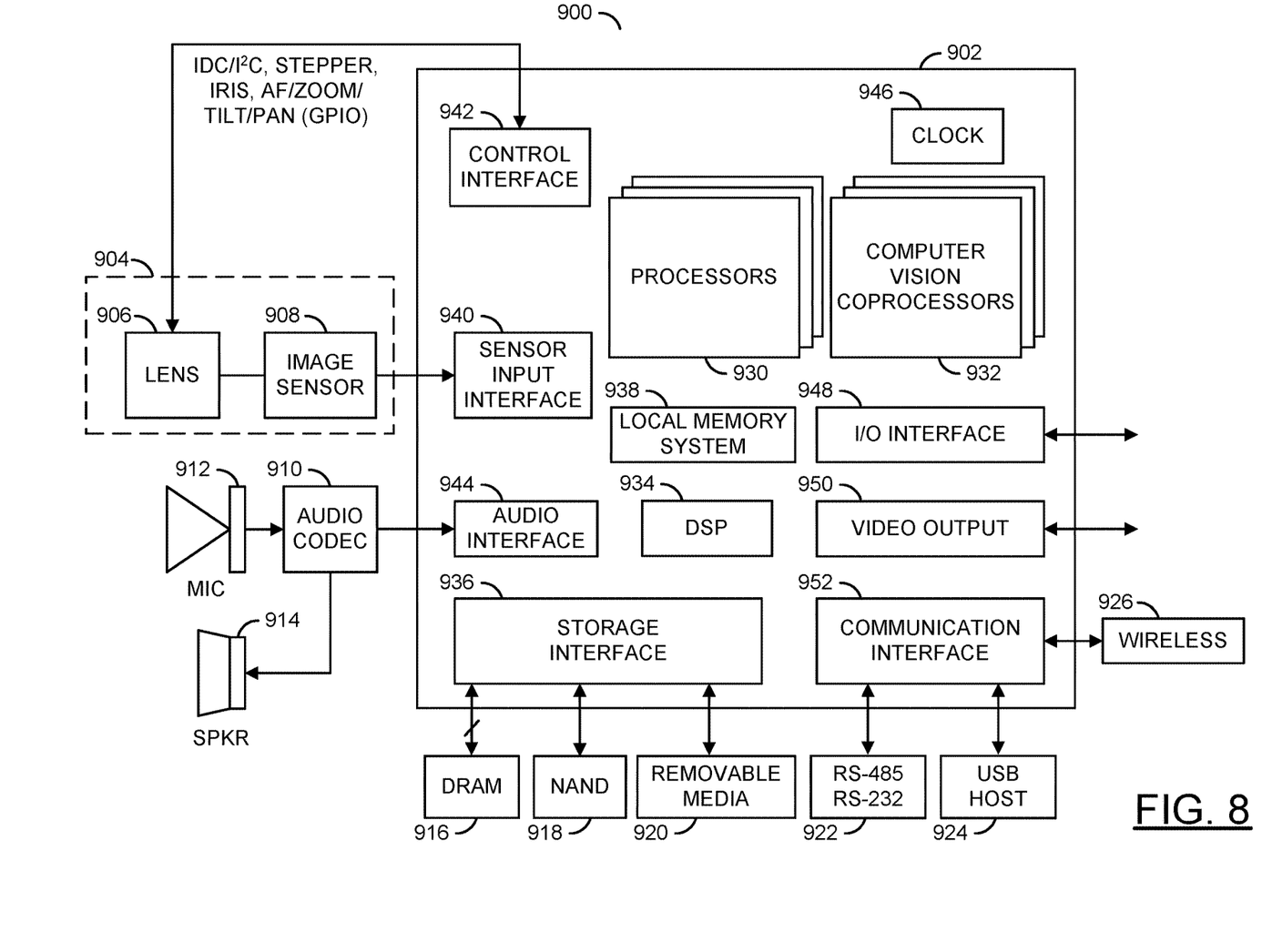
FIG. 8 is a diagram illustrating a camera system incorporating automatic number plate recognition and automated amber alert vehicle detection in accordance with embodiments of the invention.

Referring to FIG. 8, a diagram of a camera system 900 is shown illustrating an example implementation of a computer vision system in accordance with an embodiment of the invention. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 7.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera 60. The lens assembly 906 may capture and/or focus light for the image sensor 908. The lens assembly 906 may implement an optical lens. In an example, the lens assembly 906 may be a fixed focus lens. In another example, the lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera 60.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. In an example, the image sensor 908 may present converted image data as a color filter array (CFA) formatted bitstream. In another example, the image sensor 908 may present converted image data as a modified color filter array (RGB-IR) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930, a number of blocks (or circuits) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The number of circuits 930 may be processor circuits. In various embodiments, the circuits 930 may include one or more embedded processors (e.g., ARM, etc.). The circuits 932 may implement a number of computer vision related coprocessor circuits. In an example, one or more of the circuits 932 may implement an object detection engine in accordance with example embodiment of the invention. The circuit 934 may be a digital signal processing (DSP) module. In some embodiments, the circuit 934 may implement separate image DSP and video DSP modules. The circuit 936 may be a storage interface. The circuit 936 may interface the processor/camera circuit 902 with the DRAM 916, the non-volatile memory 918, and the removable media 920.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the coprocessors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I²S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-F, UART, etc.). In one example, the communication module 952 may implement a secure digital input output (SDIO) interface. The communication module 952 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 952 may also include support for communicating using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, Zig-Bee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.). The processor/camera circuit 902 may also include support for determining date, time, and/or location using a global navigation satellite system (e.g., GNSS, GPS, GLONASS, etc.) receiver. In an example, the processor/camera circuit 902 may be integrated with an integrated global navigation satellite system receiver or be configured to communicate with an external receiver (e.g., in the vehicle).

In various embodiments, on-camera automatic number plate recognition (ANPR), person and vehicle detection, and/or vehicle make/model recognition capabilities may be leveraged together with an internet connection on a cellphone of a vehicle occupant to facilitate automated suspicious vehicle identification. In an example, a vehicle camera (e.g., a dashcam, etc.) may capture video frames, detect license plate and vehicle information (e.g., number, state, make, model, color, style, etc.), and store identified license plate and vehicle information together with location and time information. In an example, the camera may implement the automatic number plate recognition (ANPR), the person and vehicle detection, and/or the vehicle make/model recognition capabilities utilizing a very efficient region of interest (ROI) pooling method that may achieve significant speed while maintaining object detection performance. In an example, the camera may also include any modern two-stage object detection networks. In an example, the camera may be enabled to run modern convolutional neural network (CNN)-based object detectors in real-time on resource-limited hardware for the on-camera automatic number plate recognition (ANPR), person and vehicle detection, and/or vehicle make/model recognition capabilities, as well as for time-critical applications such as a self-driving vehicle.

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a camera configured to capture images of an environment around a vehicle;
   a memory mounted within said vehicle and configured to store data; and
   a processing circuit mounted within said vehicle and configured to (i) perform automated number plate recognition using the images to create a history of detected license plates in said memory, (ii) continuously update the history of detected license plates in said memory, and (iii) concurrently search the history of detected license plates in said memory in response to receiving a request from a communication device of a vehicle user for information matching a broadcasted alert received by the communication device of the vehicle user.

2. The apparatus according to claim 1, wherein the history of detected license plates further comprises location, date, and time information.

3. The apparatus according to claim 2, wherein said location, date, and time information are obtained using a built-in global navigation satellite system capability of said camera.

4. The apparatus according to claim 1, wherein said history of detected license plates further comprises information about vehicles associated with the detected license plates.

5. The apparatus according to claim 1, wherein said processing circuit is further configured to continuously record license plate information in a predefined data structure stored in said memory.

6. The apparatus according to claim 1, wherein said broadcasted alert received by said communication device comprises an Amber alert notification with license plate information.

7. The apparatus according to claim 1, wherein said processing circuit is further configured to perform one or more of person detection, vehicle detection, and vehicle make/model recognition.

8. The apparatus according to claim 1, wherein said processing circuit is further configured to communicate information associated with said detected license plates in said history of detected license plates from said memory to said communication device via a wireless link.

9. The apparatus according to claim 8, wherein said communication device is further configured to query the vehicle user about forwarding information received from the processing circuit to one or more authorities.

10. A method of automating response to an Amber alert comprising:
- capturing images of an environment around a vehicle using one or more cameras mounted on the vehicle;
- performing, using a processing circuit mounted within said vehicle and associated with said one or more cameras, automated number plate recognition using the images to create a history of detected license plates in a memory mounted within said vehicle and connected to said processing circuit;
- continuously updating the history of detected license plates in the memory mounted within said vehicle; and
- in response to receiving a request from a communication device of a vehicle user, concurrently searching the history of detected license plates in the memory mounted within said vehicle for information matching the request, wherein the communication device of the vehicle user is configured to generate the request in response to receiving a broadcasted alert.

11. The method according to claim 10, further comprising:
- performing, using said processing circuit associated with said one or more cameras, one or more of person detection, vehicle detection, and vehicle make/model recognition.

12. The method according to claim 10, further comprising:
- communicating the information matching said request from said memory connected to said processing circuit to said communication device of said vehicle user via a wireless link.

13. The method according to claim 10, further comprising:
- querying said vehicle user about forwarding the information received from the processing circuit to one or more authorities.

14. The method according to claim 10, further comprising automatically forwarding the information received from the processing circuit to one or more authorities.

15. The method according to claim 10, further comprising storing location, date, and time information corresponding to each detected license plate in the history of detected license plates.

16. The method according to claim 15, wherein said location, date, and time information are obtained using a built-in global navigation satellite system capability of said one or more cameras.

17. The method according to claim 10, further comprising storing information about vehicles associated with the detected license plates in said history of detected license plates.

18. A dash camera comprising:
- a camera configured to capture images of an environment around a vehicle;
- a memory configured to store data; and
- a processing circuit connected to said memory and configured to (i) perform automated number plate recognition using the images to create a history of detected license plates in said memory, (ii) continuously update the history of detected license plates in said memory, and (iii) concurrently search the history of detected license plates stored in said memory in response to receiving a request from a communication device of a vehicle user for information matching a broadcasted alert received by the communication device of the vehicle user, wherein said dash camera is removably mountable in said vehicle.

19. The dash camera according to claim 18, wherein:
- said processing circuit is further configured to communicate information associated with said detected license plates in said history of detected license plates from said memory to said communication device via a wireless link; and
- said communication device is further configured to query the vehicle user about forwarding the information received from the processing circuit to one or more authorities.

\* \* \* \* \*